US008580344B2

(12) United States Patent
Kalyankar et al.

(10) Patent No.: US 8,580,344 B2
(45) Date of Patent: Nov. 12, 2013

(54) STAMP USAGE TO ENHANCE SURFACE LAYER FUNCTIONALIZATION AND SELECTIVITY

(75) Inventors: Nikhil D. Kalyankar, San Jose, CA (US); Zachary Fresco, Santa Clara, CA (US); Chi-I Lang, Sunnyvale, CA (US)

(73) Assignee: Intermolecular, Inc., San Jose, CA (US)

( * ) Notice: Subject to any disclaimer, the term of this patent is extended or adjusted under 35 U.S.C. 154(b) by 1002 days.

(21) Appl. No.: 12/405,218

(22) Filed: Mar. 16, 2009

(65) Prior Publication Data

US 2009/0232966 A1    Sep. 17, 2009

Related U.S. Application Data

(60) Provisional application No. 61/037,054, filed on Mar. 17, 2008.

(51) Int. Cl.
| | |
|---|---|
| *G01N 31/00* | (2006.01) |
| *G01N 31/20* | (2006.01) |
| *G01N 31/22* | (2006.01) |
| *B01L 3/00* | (2006.01) |

(52) U.S. Cl.
USPC ........... 427/259; 427/256; 427/258; 427/261; 427/282; 435/4; 435/283.1; 435/287.1; 435/288.3; 435/288.4; 506/13; 506/33; 506/35; 506/36; 506/37

(58) Field of Classification Search
None
See application file for complete search history.

(56) References Cited

U.S. PATENT DOCUMENTS 5,017,509 A * 5/1991 Tuckerman ................... 438/622

| | | | |
|---|---|---|---|
| 5,925,259 A * | 7/1999 | Biebuyck et al. ................ 216/2 |
| 5,948,621 A * | 9/1999 | Turner et al. ................ 435/6.11 |
| 7,815,868 B1 * | 10/2010 | Jones et al. ................... 422/129 |
| 2002/0110932 A1* | 8/2002 | Wagner et al. ................ 436/518 |
| 2003/0032076 A1* | 2/2003 | Duffy et al. ................. 435/7.92 |
| 2003/0082652 A1* | 5/2003 | Holten-Andersen et al. ......................... 435/7.23 |
| 2004/0178523 A1 | 9/2004 | Kim et al. |

(Continued)

OTHER PUBLICATIONS

Çakir et al., "Chemical Machining", Archives of Material Science and Engineering, vol. 28, Issue 8, (Aug. 2007), pp. 499-502.*
Xia Y., Whitesides G.M.,"Soft Lithography"Angew. Chem. Int.Ed. 1998, 37, 550-575.

(Continued)

*Primary Examiner* — Michael Cleveland
*Assistant Examiner* — Lisha Jiang (57) ABSTRACT

This disclosure provides methods, devices and systems for using a stamp to enhance selectivity between surface layers of a substrate, and to facilitate functionalizing selected layers. An array of flat stamps may be used to concurrently stamp multiple regions of a substrate to transfer one or more substances to the topmost layer or layers of the substrate. If desired, the affected regions of the substrate may be isolated from each other through the use of a reactor plate that, when clamped to the substrate's surface, forms reaction wells in the area of stamping. The stamp area can, if desired, be configured for stamping the substrate after the reactor plate has been fitted, with the individual stamps sized and arranged in a manner that permits stamping within each reaction well. If applied in a combinatorial process, a robotic process may be used to transfer multiple combinations of contact substances and processing chemicals to each reaction well to perform many concurrent processes upon a single substrate (e.g., a single coupon). The methods, devices and systems provided facilitate semiconductor design, optimization and qualification, and may be adapted to production manufacturing.

15 Claims, 7 Drawing Sheets

(56) References Cited

U.S. PATENT DOCUMENTS

| | | | |
|---|---|---|---|
| 2007/0004063 A1 | 1/2007 | Aghababazadeh et al. | |
| 2007/0202614 A1* | 8/2007 | Chiang et al. | 438/14 |
| 2007/0267631 A1 | 11/2007 | Weiner et al. | |
| 2008/0095985 A1* | 4/2008 | Frey et al. | 428/156 |
| 2009/0237758 A1* | 9/2009 | Begon et al. | 359/2 |
| 2010/0294844 A1* | 11/2010 | Loiret-Bernal et al. | 235/494 |

OTHER PUBLICATIONS

Xia Y., Whitesides G.M., "Microcontact Printing of Alkanethiols on Copper and Its Application in Microfabrication", Chem.Mater. 1996, 8, 601-603.

Kalyankar N.D., "Arraying of Intact Liposomes Into Chemically Functionalized Microwell Surfaces", Langmuir 2006, 22, 5403-5411.

* cited by examiner

FIG. 19 understand

STAMP USAGE TO ENHANCE SURFACE LAYER FUNCTIONALIZATION AND SELECTIVITY

This disclosure relates to semiconductor processing and, in particular, to soft lithography stamping methods, device and systems.

BACKGROUND

Semiconductor processing typically involves the fabrication, patterning and processing of individual layers of material to impart unique electrical properties to those layers. The size and complexity of many modern semiconductor devices renders the design process both time consuming and costly and, once implemented, each new design may be subjected to optimization and qualification steps, which are also time consuming and costly.

One common processing task that contributes to expense is via and post processing. Because such processing typically is performed on an intermediate semiconductor layer, liquid chemicals are typically used as part of the processing step, so as to permit penetration to and processing of non-surface layers of the semiconductor being processed. The use of liquid chemicals can require care to avoid unintended reaction of the chemicals with other layers of the semiconductor, and the use of excess chemicals can also affect the timing and cost of optimizing a design.

A need exists for a way of speeding up the design, optimization and qualification tasks of semiconductor manufacture. A need also exists for a method that reduces the cost associated with these processes. Still further, a need exists for a semiconductor processing method that minimizes the quantity of liquid chemicals that may be needed in these processing tasks, and maximizes the effectiveness of those chemicals. Ideally such a solution would have application not only to the design, optimization and qualification phases of semiconductor design, but to commercial fabrication processes as well. The present invention satisfies these needs and provides further, related advantages.

BRIEF DESCRIPTION OF THE DRAWINGS

FIG. 3, consisting of FIGS. 3A, 3B, 3C and 3D, shows the use of two flat stamps to transfer one or more substances to the top layer of a patterned substrate 301.

FIG. 3D also illustrates that the stamped substances may, if desired, be removed following process steps, i.e., the stamping process may be removable or reversible, as appropriate.

FIG. 6 also illustrates that an attachment bar 519 may be used to permit attach and release of the array 501 with a robotic arm; FIG. 6 also illustrates that the array of flat stamps may be arranged such that stamping surfaces 515 can be mounted in a common plane, identified by dashed line 517.

FIG. 7 illustrates that, if desired, each stamp in the array can include an adjustable mounting mechanism that also includes a shock absorber mechanism, so as to permit each stamp in the array to have an adjustable height and to contact a substrate with a like amount of contact force.

FIG. 8 illustrates a circular stamping surface 801.

FIG. 14 is a plan view of a patterned substrate that has been stamped by an array of stamps, to create multiple regions that will then be processed; FIG. 14 illustrates transfer of three different substances via an array of fifteen stamps. In FIG. 15, it is seen that circular flat stamps were used to create circular printed regions (within fifteen corresponding circular regions). The regions in each of three rows 1405, 1407, and 1409 are seen as filled-in with a different hatching pattern to represent the transfer of similar substance by the stamps within each row, but with a different transfer substance from row-to-row.

FIG. 15 illustrates that fifteen different substances "A"-"O" have been used, one being deposited on a top substrate layer within each of the fifteen regions.

FIG. 18 is a plan view of a patterned substrate where two stamping processes have each used an array of fifteen stamps to create overlapping stamp patterns; contrasted with the example presented by FIG. 17, where stamps were depicted as non-overlapping, FIG. 18 illustrates that the stamps can be made to partially or completely overlap each other. FIG. 18 in particular shows a stamping pattern having geometries stamped only with a first substance (1807), only with a second substance (1809), with both substances (1811), and with no substances, i.e., to provide surface area (1813) reserved for use as a control area.

DETAILED DESCRIPTION

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application to certain methods and devices. The description set out below exemplifies application of the invention to a combinatorial testing system that may be used to perform simultaneous processing on different areas of a semiconductor substrate. The invention, however, may also be applied to other methods and devices as well.

I. INTRODUCTION

The present invention may be embodied in a method of using a stamp to perform semiconductor processing. In this regard, the stamp may be applied as part of a soft lithography process in which a substance is stamped upon the top of a substrate to help enhance selectivity between substrate layers, or to assist with functionalizing a specific layer (e.g., a topmost layer). Stamps with a substantially flat stamping surface may be employed so that the transferred substance is not applied to other unintended semiconductor layers, for example, within trenches or "vias" of a patterned substrate. As used herein, the term "flat stamping surface" should be understood to refer to a stamp having a generally continuous, un-patterned surface such that when applied to a substrate, the stamp will not reach into gaps, holes, vias or other forms of layer patterning that may render upper layers of a semiconductor discontinuous.

A substance transferred to a substrate by a stamping process may be employed in processing substantially only one or more top layers of the substrate, in order to functionalize or change the top layer(s) in some manner, or alternatively, to facilitate better discrimination between the top layer(s) and to any other layers of the substrate in order to process selective layers. The specific methods and systems shown in this disclosure may thus facilitate better semiconductor processing and may provide other advantages.

The present invention may also be embodied in a method of using an array of stamps, so as to perform processing in parallel. The array of stamps may be employed in general semiconductor processing, but one advantage of using an array is to permit combinatorial testing using the processes, devices and systems described in this disclosure; that is to say, by using an array of stamps in parallel, multiple regions of a semiconductor may be simultaneously tested in parallel using different combinations of substances and processes, to speed up the design, optimization and qualification processes referred to earlier. For example, one embodiment discussed in this disclosure exemplifies an array of fifteen stamps, and the use of these stamps can permit fifteen or more separate processes to be concurrently performed, thereby greatly enhancing semiconductor processing and testing. As used herein, the term "region" should be understood to refer to a substrate or portion of substrate that is to be subjected to a process. If the region is isolated from another region, or is processed separately or in parallel, this separation refers to segregating the two regions so that their respective processing is different. Finally, a "stamped region" should be understood to be a region that is stamped in part or in full, whether the stamp lies partly or entirely within the region.

Figure 1:
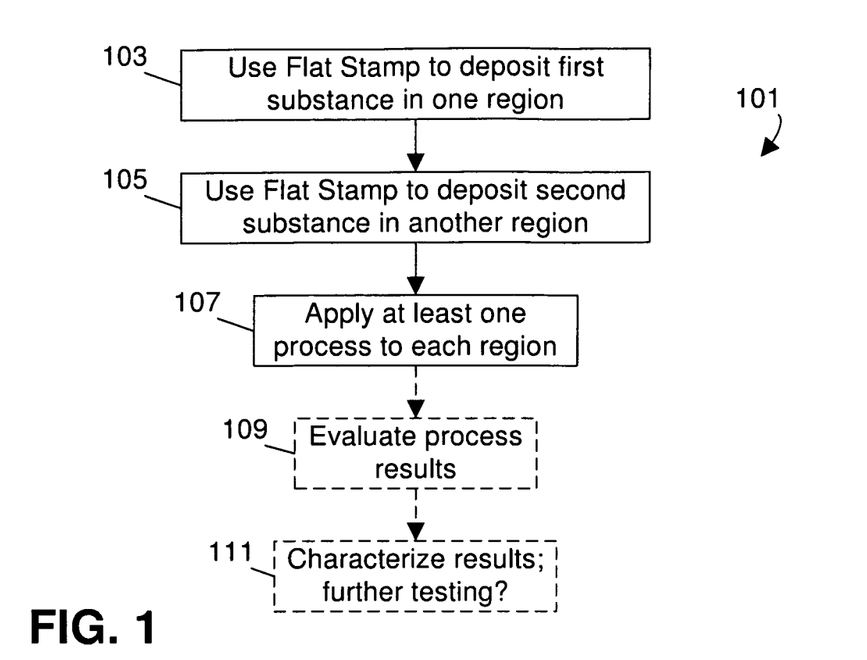
FIG. 1 is a flow chart that illustrates a method of using a flat stamp to deposit a substance in a first region, and also using a flat stamp to deposit a substance in a second region. The use of a dashed line indicates optional steps, such as the evaluation and characterization of results, and further experimentation (in combinatorial testing embodiments discussed below, for example).
Figure 2:
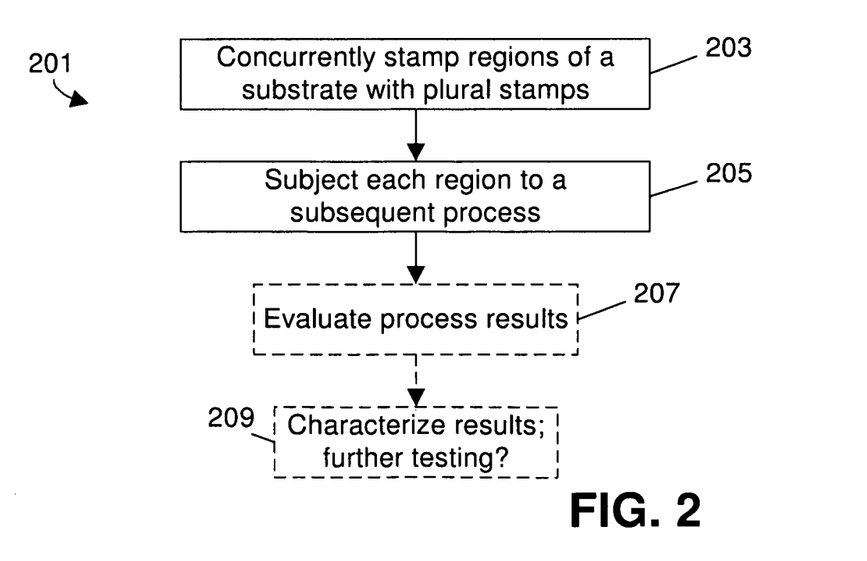
FIG. 2 is a flow chart that illustrates a method of using plural stamps to simultaneously stamp different regions of a substrate for chemical and/or physical modification. As with FIG. 1, the use of a dashed line in FIG. 2 indicates optional steps associated with evaluation, characterization and possible further experimentation.

FIGS. 1-3 show embodiments that help further explain these principles.

In particular, FIG. 1 illustrates a method 101 of using a flat stamp to deposit multiple substances on the top of a substrate. The method calls for the use of a flat stamp to deposit a first substance in one region of the substrate. The deposited substance can be any substance used in semiconductor processing, including without limitation chemical agents that help functionalize one or more layers of the semiconductor, resists or other inhibiting materials that help add protection to part of the substrate (to help it resist effects of a subsequent chemical or other process), surfactants, passivators, bi-functional layers, specific purpose chemicals, or other types of substances, as indicated by process step 103. [At various times in this disclosure, the use of flat stamps will be described as helping transfer a substance to a top layer of a semiconductor substrate; it should be understood, however, that either a patterned or un-patterned substrate may be used, and that the stamps may deposit materials on the top layer or top several layers of a substrate. In addition, it should be understood that a top layer of one area of a substrate may be a different layer than a top layer of a different area or region.] A flat stamp is then also used to transfer a second substance to a top of the substrate in another region; the stamp may be the same stamp as was used to transfer the first substance, or it can be a second stamp that transfers the second substance at the same or a different time than the first stamp. Once the substances have been transferred, a subsequent process may be applied within each region, as indicated by steps 105 and 107.

The method 101 of FIG. 1 may be optionally applied in a combinatorial testing system. The method of FIG. 1 calls for two different substances to be applied in different regions, and the subsequent process applied to each region may be the same for both regions or different for each region; in this manner, combinatorial testing may be applied on a different substance-process combination in each region. For example, if it is desired to test a semiconductor fabrication step that involves post or via processing, the method of FIG. 1 permits simultaneous application of different passivating materials using step 103 (for restricting processing to vias or posts) to the plane of the substrate and it permits the testing of different chemistries in these processes. If desired, the subsequent processing may include liquid chemical processing to affect the "unprotected" vias or posts. Finally, depending on the results of processing for the regions, the processing for each region may be evaluated and characterized, and either substance, a specific chemical used in processing, or a combination of these things may then be selected for further testing (as indicated by optional function blocks 109 and 111).

As indicated by FIG. 2, a method 201 may be employed that uses multiple stamps. Per function block 203, plural stamps may be used to concurrently stamp a substrate in multiple regions. A subsequent process may thereafter be applied to each region, and if optionally desired (for example, in a design, optimization, qualification or other testing environment), process results may be evaluated and further experimentation may be performed, as indicated by reference numerals 205, 207 and 209.

The method of FIG. 2 can be adapted to the same task as the method of FIG. 1 if desired. For example, as indicated above, the method of FIG. 1 may use one or more stamps to deposit plural substances atop a substrate. If desired, the use of multiple stamps and concurrent stamping, called for by the method depicted in FIG. 2, may also be adapted to combinatorial applications, such as involving the transfer of multiple substances to different regions of a substrate at the same time. If desired, flat stamps can be used for this purpose, and can be used to deposit self-assembled monolayers for use in subsequent processing.

As should be seen from these principles, each of the implementations illustrated by FIG. 1 and FIG. 2 may be employed to significantly speed up certain types of semiconductor processing, especially where it is desired to functionalize a layer, or enhance selectively between layers (e.g., for post or via processing). In a combinatorial testing implementation, the use of multiple stamps in parallel can be used to perform and compare many different processes at once, thereby speeding up design, optimization and qualification steps.

FIG. 3 is used to help exemplify one possible application to semiconductor processing, and is broken into four FIGS., including FIGS. 3A, 3B, 3C and 3D.

Figure 3A:
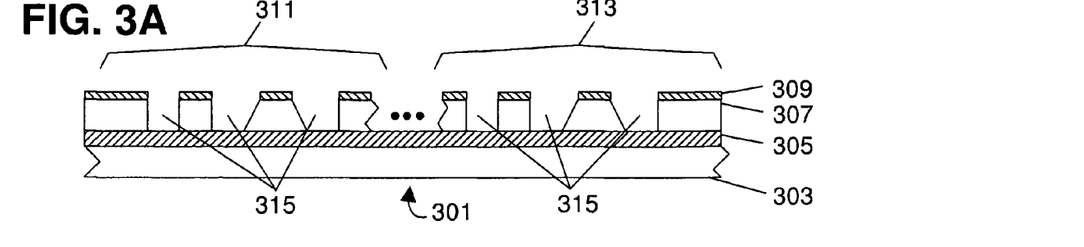
FIG. 3A illustrates the substrate 301, its various layers including a top layer 309, and two regions 311 and 313 that are to be chemically or physically modified using a stamping process.

FIG. 3A depicts an example of a highly enlarged portion of a patterned semiconductor substrate 301. The substrate includes a base layer (often also referred using the term "substrate," although "base layer" will be used herein so as to avoid confusion) 303, a first layer 305 that has been deposited on top of the base layer, and second and third layers 307 and 309; in the example of FIG. 3A, layer 309 is seen to be the topmost layer. It should be appreciated that this particular arrangement is illustrative only, and that conventional semiconductors may have any number of layers, including layers that travel vertically or are patterned horizontally or vertically, or that are thicker, thinner or entirely absent in certain parts of the semiconductor. In the example presented by FIG. 3, the layers 305, 307 and 309 could consist of two metal layers with an insulator sandwiched between, but the layers could also be directed to other purposes. Generally speaking, the layers may be made of substances and routed so as to form transistors, diodes, resistors, capacitors, logic gates, and other forms of electronic components and their associated signal lines and leads. In the example of FIG. 3A, there are two regions that represent different areas of the patterned substrate and that will be the subject of processing, and these are labeled 311 and 313; reference numeral 315 illustrates that the substrate 301 has been patterned to have trenches or vias that lie below the top layer 309 of the patterned substrate; it should be assumed in the context of the example of FIG. 3 that it is desired to perform some type of sort of processing below the top layer, within the vias 315.

Conventionally, processing would be performed on a semiconductor "wafer" or coupon (a separated part of a wafer), with a wafer often having an eight or twelve inch diameter, and with a coupon generally being on the order of a sixth or eighth of a wafer. Each wafer may be used to fabricate anywhere from dozens to hundreds of semiconductor devices depending upon the type of device being fabricated, and the example of FIG. 3A should therefore be taken in context as only providing an illustrative close-up of a part of a coupon.

Figure 3B:
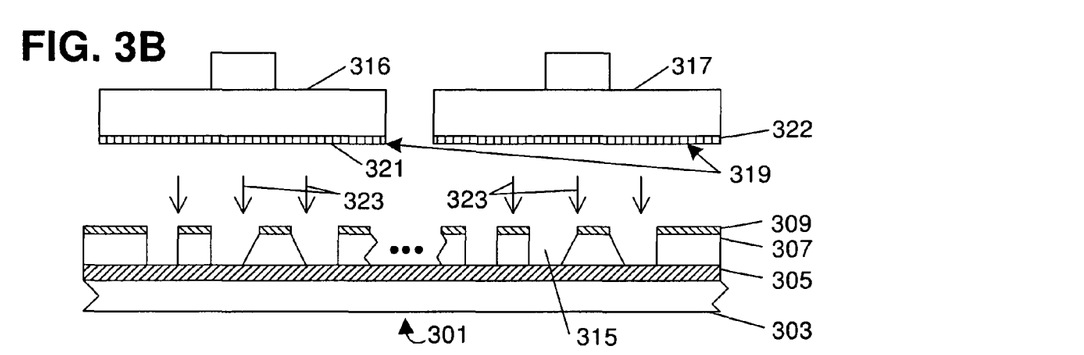
FIG. 3B shows application of two flat stamps, 316 and 317, to transfer one or more substances 321 and 322 to the top layer 309 of the substrate. Because the stamps are flat, the substances 321 and 322 are transferred substantially only to the top layer. Although designated by two different numerals (321 and 322) in FIG. 3, the substances may be made of the same material or they may be different for each region.

Using one of or both of the methods described above, processing of the semiconductor substrate may be effected by stamping the top of the patterned substrate with one or more flat stamps, designated by reference numerals 316 and 317 in FIG. 3B. In particular, it should be observed that each stamp has a substantially flat stamping surface 319 that is adapted to transfer one or more substances to the top layer or layers of the patterned substrate via interfacial contact. In FIG. 3B, the stamping surface of each stamp is seen to be coated with a different substance 321 and 322, with each stamp 316 and 317 being positioned to transfer its substance to the substrate within a corresponding region, region 311 in the case of stamp 316, and region 313 in the case of stamp 317. A number of downward arrows 323 indicate that the stamps are moved toward the substrate to have interfacial contact with the top layer 309 for purposes of the transfer. Because the stamps are configured to be flat stamps, they transfer their respective substances only to the top layer and do not deposit any substantial part of the substance within vias 315 for example. [Depending on the materials used to make the stamp, in some embodiments the stamps may be made to coat more than just the topmost layer only, but for purposes of the present illustration, it should be assumed that the flat stamps transfer their substances only to whichever layer makes interfacial contact with the flat surface of the stamps 319.]

Figure 3C:
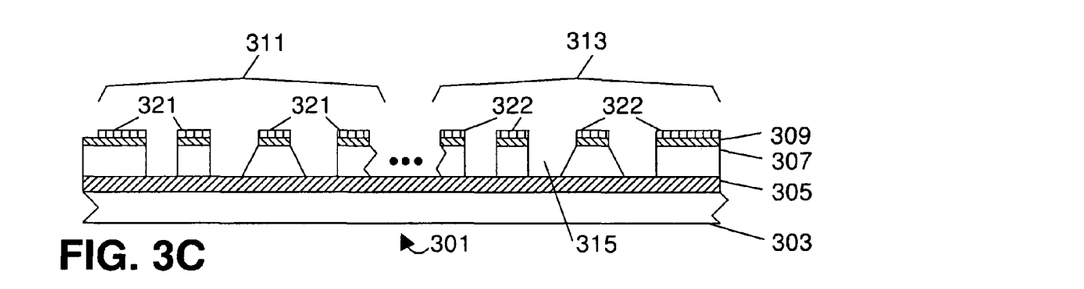
FIG. 3C shows the substrate with the substances 321 and 322 lying atop the top layer 309, and not on bottom layers (such as layer 305) or within vias 315. Once stamped as depicted by FIG. 3C, the patterned substrate will be ready for application of one or more processes, as part of a design, testing, qualification, optimization, production, or other standard semiconductor process, if desired.

FIG. 3C illustrates the patterned substrate 301 after the stamping has been completed. In particular, the top layer 309 is illustrated as being coated by the first substance 321 within the first region 311, and by the second substance 322 within the second region 313. In this state, the top layer 309 has been prepared for an ensuing process, such as a wet process that will operate upon one of the layers of the patterned substrate. If it is desired to process the top layer, the transferred substances may be chemicals that enhance the processing of functionalization of the top layer by the ensuing process, or if it is desired to process other layers, the transferred substances may be chemicals that insulate or otherwise protect the top layer from ensuing processes. In the example of FIG. 3C, it should be assumed that it is desired to process one of the bottom layers (such as layer 305) and, therefore, that substances which inhibit processing are used to stamp the top layer 309.

Figure 3D:
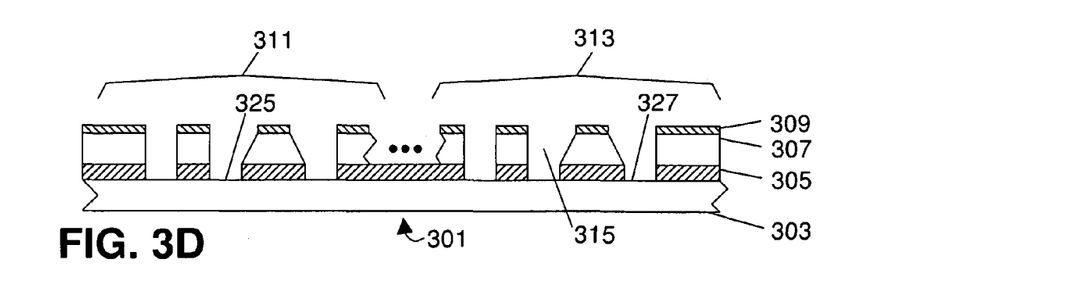
FIG. 3D shows the substrate following application of one exemplary subsequent process, namely, a process which has removed exposed material in a lower layer 305 of the semiconductor; because the top layer was in this example protected by the substances stamped on to the top layer, the illustrated stamping method serves to increase selectivity of whichever process is applied, be it an etch or other process.

FIG. 3D illustrates both resultant patterning of the layer 305, such as for example, by a subsequent liquid chemical etch process. If desired as part of a combinatorial testing process, for example, different chemicals may be used for the etch, in combination or in a manner isolated to each region. It should be noted that in FIG. 3D, vias 315 are depicted as having been processed to remove part of the layer 305 in areas not covered by materials 321 or 322 (seen in FIG. 3C); FIG. 3D also illustrates that the transferred substances may be reversible or removable, and accordingly, these materials are not seen in FIG. 3D.

Importantly, while FIG. 3D illustrates the effect of an etch process, it should be appreciated that many other semiconductor processes may be tested and evaluated using the principles described above. For example, it may be desired in some applications to use materials 321 and 322 as passivators, for use in depositing materials within trenches or vias. Any number of different semiconductor processing steps may be evaluated using the principles described above, through the use of stamping to assist with layer selectivity.

If it is assumed that the processing steps represented by FIG. 3 are part of a testing process where it is desired to test the effects of different types of processes upon a particular design or semiconductor material, then the results of the process may be made to differ from region to region, as denoted by reference numerals 325 and 327 in FIG. 3D. If desired, the results and associated processes may be characterized, and particular tests may be repeated or modified if it is desired to conduct further testing.

With two particular stamping methodologies thus introduced, and with an example application of stamping a semiconductor substrate thus introduced, more detailed implementations will now be discussed, with reference to FIGS. 4-11. It should be appreciated that using the principles described above, applied to combinatorial processing, a wide variety of processes may be simultaneously tested and evaluated in a single substrate, in a single etching/deposition process step, to simultaneously carry out many experiments per substrate, thereby enhancing and speeding semiconductor design, optimization and qualification processes.

II. USE OF AN ARRAY OF FLAT STAMPS

Figures 4, 5, 6:
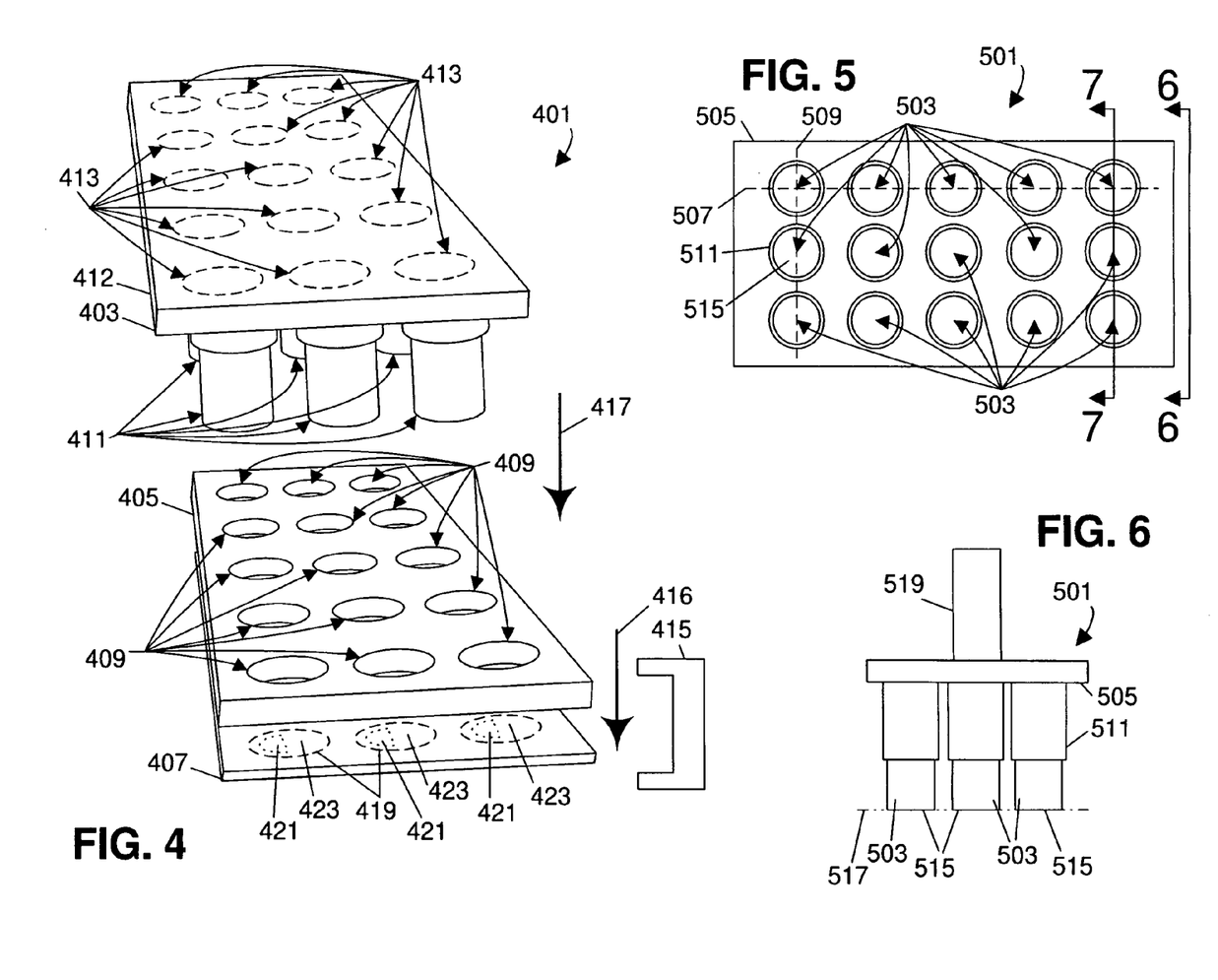
FIG. 4 is a perspective view of an array of stamps 403, an optional reactor plate 405 and a substrate 407. Each stamp in the array may have a flat stamping surface, so as to concurrently stamp substantially only the topmost layer or layers of the substrate 407. Especially if it is desired to perform processing in a single clean room procedure, the reactor plate may be first clamped to the substrate such that apertures 409 in the plate form a reaction well against the substrate, with each stamp in the array adapted to stamp the substrate through the reactor plate (e.g., at the bottom of the "well"), with a subsequent wet process thereafter being applied.
FIG. 5 is a bottom plan view of an array of stamps, taken so as to show individual stamps 503 extending "out of the page" relative to a base plate 505.
FIG. 6 is a side view of the array of FIG. 5, taken along line 6-6 of FIG. 5.

FIG. 4 illustrates a system that may be used for parallel processing of multiple regions of a substrate using reaction wells and using an array of flat stamps. FIG. 4 helps illustrate that, if desired, the system may be implemented in a manner conducive to robotic testing or where minimal intervention is desired, e.g., in a clean room environment and FIG. 4 thus illustrates a system where reaction wells may be formed first, with stamping 417 of a substrate occurring through the wells. Other systems and implementations are also possible, however, including without limitation stamping without use of reaction wells or stamping before well formation, and it should be understood the implementation depicted in FIG. 4 is illustrative only.

FIG. 4 shows a system 401 that includes an array 403 of flat stamps, a reactor plate 405, and a substrate 407 on which it is desired to conduct processing. The reactor plate is seen to include a number of circular holes or "apertures" 409 that are positioned to receive a corresponding stamp 411 in the array and that are sized slightly larger than the corresponding stamp, so that the stamp can penetrate through the reactor plate and engage the substrate. To this end, each stamp 411 is depicted schematically as being cylindrical and extending beneath a base plate 412 for purposes of this engagement. Although the apertures and stamps are depicted as being circular in cross-section, any shape configuration may be used as appropriate for the particular implementation, such as square, semicircle, pie or another shape, as will be discussed further below. The array 403 is depicted as free in FIG. 4 for convenience of description, although it typically will include some type of mount, such that it can be articulated by the use of a robotic or other precision mechanism (not shown in FIG. 4). To help illustrate the correspondence between stamp position and shape and aperture position and shape, the top surface of the stamp array is depicted in FIG. 4 with dashed line circles 413 to illustrate that the stamps are positioned in the implementation of FIG. 4 to match the apertures 409 in the reactor plate (i.e., the dashed line circles 413 are for purposes of illustration only).

In practice, reaction wells can be formed by clamping the reactor plate 405 to the substrate 407, as schematically represented by a clamp 415 and motion arrow 416 in FIG. 4. If desired, a gasket or other sealing structure may be used in between the reactor plate and substrate to help ensure an air tight or liquid tight seal. Processes and materials for forming the reaction wells may be used according to the teachings of US Patent Application Publication Number 2007/0267631, which is hereby incorporated by reference. In the context of FIG. 4, it should be assumed that it is desired to form liquid chemical reaction wells in which the effects of different combinations of liquid chemical process with stamped substances may be observed, for purposes of enhancing speed of the design process, or ensuing optimization or qualification steps, as appropriate. The area of substrate encompassed by each well is depicted in FIG. 4 by a dashed line circle 419, with areas within these circles accessible through a corresponding aperture in the reactor plate, and areas outside the circle covered by the reactor plate and therefore not subject to the ensuing process. FIG. 4 also illustrates a second, semicircular dashed line 421 within each circle, which it should be assumed corresponds to a semicircular shape of the stamping surface of each flat stamp. In the embodiment presented by FIG. 4, the well size defines the region that will be subsequently processed, and the stamps are depicted as semicircular in order to stamp approximately half of the region of substrate within each reaction well, to leave both a stamped area 421 as well as an unstamped "control" area 423 within each region (to further the number of tests that can be simultaneously conducted after the stamping process).

Although FIG. 4 alludes to the creation a single stamped area 421 within each region, as will be discussed further below, it is possible to size the reaction wells so as to accommodate multiple stamps in each well or to, alternatively, use successive, overlaid stamps to deposit combinations of patterns. These options will be further referenced below.

FIG. 5 shows a bottom plan view of an array 501 of stamps. The exemplary array of FIG. 5 has fifteen stamps 503 that are attached to mounting chassis in the form of a base plate 505. The stamps are seen as arranged in three rows (with a first row being indicated by a horizontal dashed line 507) and five columns (with a first column indicated by a vertical dashed line 509). Each stamp 503 can have a stamping surface 515 formed of PDMS (polydimethylsiloxane) or any other suitable polymeric material and can be molded to be generally cylindrical in shape for purposes of stamping through a reactor plate (as was previously mentioned in FIG. 4). Behind each stamp 503 (from the perspective of FIG. 5) is a mounting mechanism 511 that permits appropriate interfacial contact between the flat surface of each stamp and a top layer of substrate. The stamps in FIG. 5 are depicted as circular in shape, and are adapted for use in a soft lithography process, as has been described above.

FIG. 6 illustrates a side view of the array 501, using the view perspective taken along line 6-6 in FIG. 5. In particular, FIG. 6 shows how stamps 503 in each of three rows are mounted beneath the base plate 505 for purposes of stamping a substrate. Within each mounting mechanism (schematically depicted as a rectangle in FIG. 6), as will be described below, is a shock absorber mechanism that permits each stamping surface 515 to resiliently engage with a substrate's surface, ensuring uniform and sufficient contact pressure. If it is desired to use the stamps in applications where there will be a substantially uniform, flat surface that is to be stamped, the stamping surfaces can be caused to lie in a common plane 517. In the embodiment depicted in FIG. 6, this result can be achieved both by fabricating the stamps in situ and by also providing a height adjustment mechanism that permits post fabrication adjustment; these design options will be discussed further below, in connection with FIG. 7. FIG. 6 also shows an attachment bar 519, which can be used to mount the stamp to a robotic arm (not shown in FIG. 6) for automated processes, or to another form of articulation mechanism.

A. Use of a Shock Absorber Assembly to Mount Each Stamp.

Figure 7:
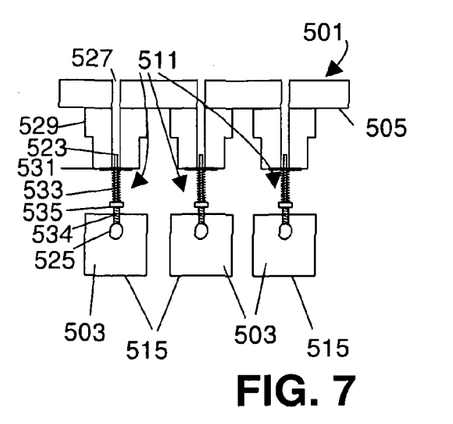
FIG. 7 is a cross-sectional view of the array of FIG. 5, taken along line 7-7 of FIG. 5.

FIG. 7 shows a cut-away view of the stamp array 501 that was introduced in FIG. 5, taken along the viewing perspective indicated by line 7-7 in FIG. 5. FIG. 7 helps illustrate a way of mounting each of the stamps so that stamping surface height is adjustable.

Each stamp is connected to the base plate 505 by a mounting mechanism 511 that both provides a shock absorber mechanism and allows for adjustable stamp height. In particular, each mounting mechanism includes a central rod 523 that is permitted to move axially together with the associated stamp 503 ("up and down" relative to the substrate). A lower end of the rod includes a screw head 525 upon which each stamp can be formed, and an opposing, upper end of the rod rests in a bore 527 to accommodate the stamp's height adjustment and to permit the stamp to move under bias with the substrate once interfacial contact has been made, to avoid damaging either stamp or substrate. It should be noted in FIG. 7 that if appropriate for the implementation, the bore 527 may extend part-way or completely through the base plate 505 if necessary to accommodate stamp movement. The base plate can be made of hard plastic and includes in the vicinity of each stamp a cylindrical rise 529 that terminates in a horizontal stop 531. The horizontal stop provides a base for a helix spring 533 that axially accommodates the rod 523 and that resiliently urges each stamp 503 to a neutral position (e.g., the position depicted in FIG. 7).

Each rod 523 is configured to have a lower portion that functions as an anchor 525 (as previously indicated); in this regard, the spring is 533 is coupled both to the horizontal stop and to a nut 535 engaged with the associated screw thread 534; this arrangement permits the vertical height of each stamp to be adjusted by a vertical force applied onto the anchor or the stamp if present, i.e., as the stamp is pushed onto the substrate during the stamping process, the height of the substantially flat stamping surface 515 moves linearly with the screw head 523. In one version of this assembly, the rods 523 are dowel pins with outer diameter equal to the inner diameter of the bore 527. The bore 527 in another version is relatively larger in diameter as compared with the outer diameter of rods 523 and bushings are press fitted inside bores 527. These bushings have inner diameter that corresponds to outer diameter of rods 525. This arrangement with bushings and dowel pins helps ensure that there is no lateral movement of the rods 527 during the stamping process. The friction in between rods 523 and bores 527 is also minimized by a proper selection of dowel pins and bushings.

In operation, as a stamping surface 515 engages a substrate, continued movement of the array toward the substrate permits the stamp and central rod 523 to move together within the associated bore 527, while compressing the associated spring 533. The spring is selected to have a spring force that permits this deformation without damage to the substrate or stamp, while simultaneously urging the stamp into contact with the substrate so as to apply a stamping force that is dependent upon the spring's bias; generally speaking, the springs are selected to be much more compliant than the stamp material itself (e.g., more compliant than PDMS).

The structure described above provides one example of a mounting mechanism that permits adjustment of individual stamp height and that also minimizes possible damage to the substrate or stamp if too much stamping force is applied. Through the use of a shock absorber mechanism, the stamps may be implemented as individual posts of an array in a manner that provides for consistent stamping force, while at the same time minimizing the possibility of damage to either stamp or substrate. Other designs will readily occur to those having skill in mechanical engineering.

B. Stamp Fabrication.

The mounting structure described in connection with FIG. 7 lends itself to in situ formation of a polymeric block that may be used as a stamp. The polymer may be selected to be commercially available PDMS in the form of a "Sylgard 184" silicone elastomer kit, available from E.I. du Pont de Nemours and Company. A rectangular block made from "Teflon" with an array of holes in it is first prepared, for purposes of serving as a mold for stamp fabrication. If it is desired to use the stamp array in a reaction well environment using the components introduced above, the reactor plate itself may be suitably functionalized and clamped to a substrate to function as the mold; the substrate should have a smooth flat surface, or other surface contour that will be selected to provide the stamping surface of the ultimate stamp (e.g., a substantially flat stamping surface) and, if desired, a non-stick collar or surfactant may be applied for this purpose. The substrate used to complete the mold can be modified using a Fluorine terminal silane (Heptadecaflouoro-1,1,2,2-tetrahydrodecyl) trimethoxysilane, to act as a surfactant that will ease in removal of completed stamps. Uncured polymeric solution may then be poured into the wells and the stamp array may then be clamped against the mold in a manner that the mounting mechanisms are dipped into the solution and held in place while the solution cures. For example, with the array configuration introduced above in connection with FIG. 7, the base plate may be mounted in a manner such that the screw heads are immersed in the polymeric solution, in the center of each mold or well, such that the heads are fully immersed in the solution. Accurate positioning of the anchoring point for each mounting mechanism will generally facilitate proper stamp operation by minimizing the possibility of contact forces generated in a manner inconsistent with the "up and down" motion of the resultant stamps (as was discussed previously in connection with the shock absorber structure). This assembly can then be kept at a specified temperature (e.g., seventy degrees Centigrade) overnight for curing of the PDMS. After this step, the assembly can be allowed to cool to room temperature and the Teflon block and flat substrate can then be removed, leaving the stamps ready for use (e.g., in a soft lithography process). Once fabricated, stamp height may then be adjusted in the manner that was described above. It should be noted that the PDMS stamp system is just a representative system in this case and this method can in general be used to prepare stamps of many other polymers as needed or appropriate.

C. Examples of Possible Stamp Configurations.

Figure 8:
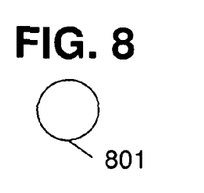
FIG. 8 is a close-up, bottom view of one possible flat stamping surface; in particular.
Figure 9:
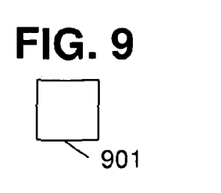
FIG. 9 is another close-up bottom view of a possible stamping surface, namely, a square stamping surface.
Figure 10:
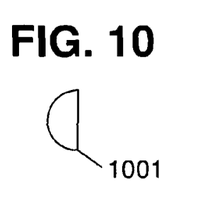
FIG. 10 is another close-up bottom view of a possible stamping surface, namely, a semicircular stamping surface.
Figure 11:
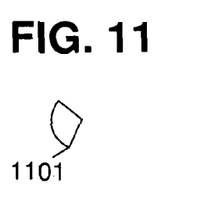
FIG. 11 is another close-up bottom view of a possible stamping surface, namely, a pie-shaped stamping surface.

Stamps may be formed to have nearly any desired shape and configuration. FIGS. 8-11 will be used to provide some examples for possible configuration of the substantially flat stamping surface of each stamp. For example, FIG. 8 shows a substantially circular stamping surface 801; this configuration may be selected for example if circular reaction wells are used and it is desired to stamp substantially the entire region of substrate isolated by within the wells. FIG. 9 shows a substantially square stamping surface 901, which may be more space efficient than circular stamps; a square stamp may be used in nearly any configuration desired (e.g., it can be used with circular reaction wells), but might be most advantageously used in a production environment, or where it is desired to test multiple transfer substances in close proximity to one another. FIG. 10 provides an example of a semicircular stamp 1001; as was mentioned previously, a semicircular stamp may be used with circular reaction wells to provide for both stamped areas and a control area within each reaction well. Finally, FIG. 11 shows a pie-shaped stamping configuration 1101, which may be advantageously employed in circular wells where it is desired to have more than one transfer material within a given well, or where it is desired to have multiple, overlapping stamps.

III. COMBINATORIAL PROCESSING USING AN ARRAY OF FLAT STAMPS

FIGS. 12-18 will now be used to describe application of the teachings introduced above to combinatorial processing and evaluation. Generally speaking, in semiconductor fabrication it is often desired to use a clean room procedure to avoid contamination of materials during testing or fabrication; accordingly, the methods and devices discussed below may be generally implemented as part of a robotic procedure where a robotic arm moves a stamp or stamp area between a number of positions, to perform a number of discrete process steps. One robotic system that may advantageously be used to provide these functions is the "Tempus F-20" system, available from Intermolecular, Inc., of San Jose, Calif. As will be described below, the use of such a system and the stamp processes and array described above facilitates a number of processes, including:

(a) ability to perform reaction and control in one reaction well;

(b) ability to avoid use of excess solvents;

(c) ability to modify only the top layer or layers of a patterned substrate using flat PDMS stamps;

(d) ability to ensure consistent, appropriate interfacial contact of a substantially flat stamping surface with each substrate (or other subject of stamping);

(e) ability to form multiple patterns within each reaction well, either simultaneously, or through repeat stamping iterations;

(f) parallel transfer of several different substances of interest using contact printing and, if desired, using reaction wells to help isolate one or more of the substances from each other; and (g) simultaneous use of different liquid chemicals in different reaction wells, with reaction wells isolating liquid chemicals from each other, as appropriate.

The devices and methods discussed below should be assumed to use the fifteen stamp array that was introduced earlier. Nonetheless, an array of any size may be used and, if it is desired to perform a large number of tests or other processes in parallel, twenty-four stamps or more may be used, if mechanically supported by the particular design.

A. Stamping a Substrate Using the Array.

Figure 12:
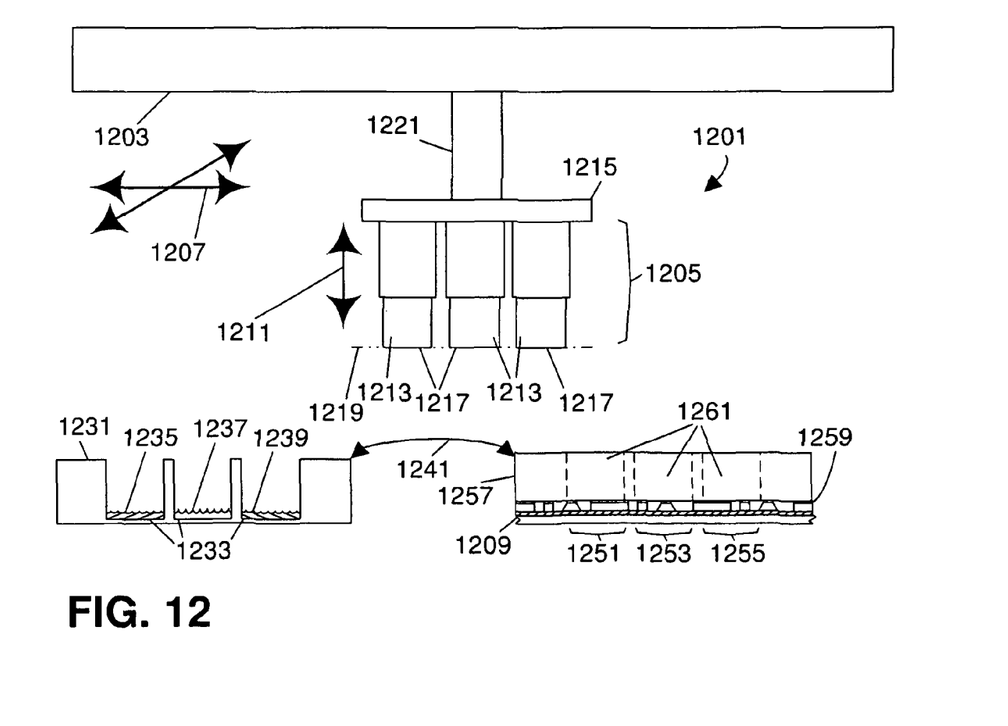
FIG. 12 is a diagram that illustrates use of an arm of a robotic mechanism to control an array of stamps to stamp a patterned substrate 1209, in each of three regions contained within respective reaction wells 1261.

FIG. 12 illustrates components of a system used in a combinatorial testing process. A robotic system 1201 includes a robotic arm 1203 and a stamp array 1205 of the type that has been described above. The robotic arm 1203 supports the stamp array for translation in both X and Y dimensions, as collectively illustrated by a set of dimensional arrows 1207. In addition, however, the robotic arm also supports vertical movement of the stamp array for purposes of stamping a substrate 1209, as indicated by a motion arrow 1211. As has been described above, the stamp array may consist of a number of stamps 1213 which are mounted to individually extend below a base plate 1215, and which each mount a polymeric block with a flat stamping surface 1217 for use in a soft lithography process. Each of the stamps is adjusted such that the collective stamping surfaces 1217 lie in a common plane 1219, so as to ideally make concurrent interfacial contact with the substrate 1209. Seen connecting the robotic arm with the stamp array, an attachment bar 1221 may be used for quick attachment and release of the array.

In order to stamp the substrate 1209, the stamp array 1205 is first articulated by the robotic arm to a dipping station 1231, where the stamps are lowered to immerse the stamping surfaces into one or more substances of interest. In an embodiment where it is desired to possibly apply different substances stamp-by-stamp, the dipping station may be configured as a number of reservoirs 1233, each of which may contain a different substance that is to be stamped onto the substrate 1209. FIG. 12 illustrates different substances 1235, 1237 and 1239 in three different reservoirs 1233, although it should be understood that these substances may be the same if desired. Generally speaking, the stamp surfaces would be immersed for an appropriate time (generally a period of seconds) sufficient to impregnate each stamp sufficiently with the desired substance, after which the stamp is raised to allow drainage of excess substance and to allow the stamps to briefly dry if appropriate to the substance at issue. The stamp array 1205 is then robotically moved to the substrate, as indicated by a motion arrow 1241, aligned with the regions of interest (1251, 1253 and 1255 in FIG. 12), and brought into conformal contact with the substrate 1209.

If it is desired to isolate each region 1251, 1253 and 1255 from one another, either for purposes associated with the transferred substances or for assisting with a subsequent wet processing step for the regions, a reactor plate 1257 may be clamped to the substrate as has heretofore been described. If a robotic workstation is used, the reactor plate/substrate assembly will typically be clamped in a fixed, regular location. The robotic mechanism will typically be programmed to move to and stop at a predetermined position, or have a sensor to prevent too much force from being applied to the stamps, i.e., such that the substances transferred by the stamps get applied to only the top layer (or several top layers, depending upon the application). In the embodiment presented by FIG. 12, it should be assumed that it is desired to only permit slight contact between the substrate and the stamping surfaces, such that only a top layer 1259 of the substrate is stamped. As was mentioned previously, the reactor plate may define apertures that, together with the substrate, form reaction wells 1261 that will be used for subsequent processing, with the reactor plate being mounted to the substrate either before or after stamping. [As was indicated previously, especially if a clean room procedure is used, the reactor plate may be clamped to the substrate before any tasks are initiated, to permit completion of all desired processing without breaking the clean room environment—to facilitate this end, the stamp array 1205 may be configured to have individually mounted stamps which extend downward, away from the base plate that mounts them, and sized such that each stamp can be matingly inserted into a corresponding reaction well 1261 to stamp the region of substrate defined by the well.] Once stamping is completed, the substrate could then be further modified to have other chemistries in the same active region, for example, via a subsequent stamping process or a solution phase process.

B. Subsequent Processing.

Figure 13:
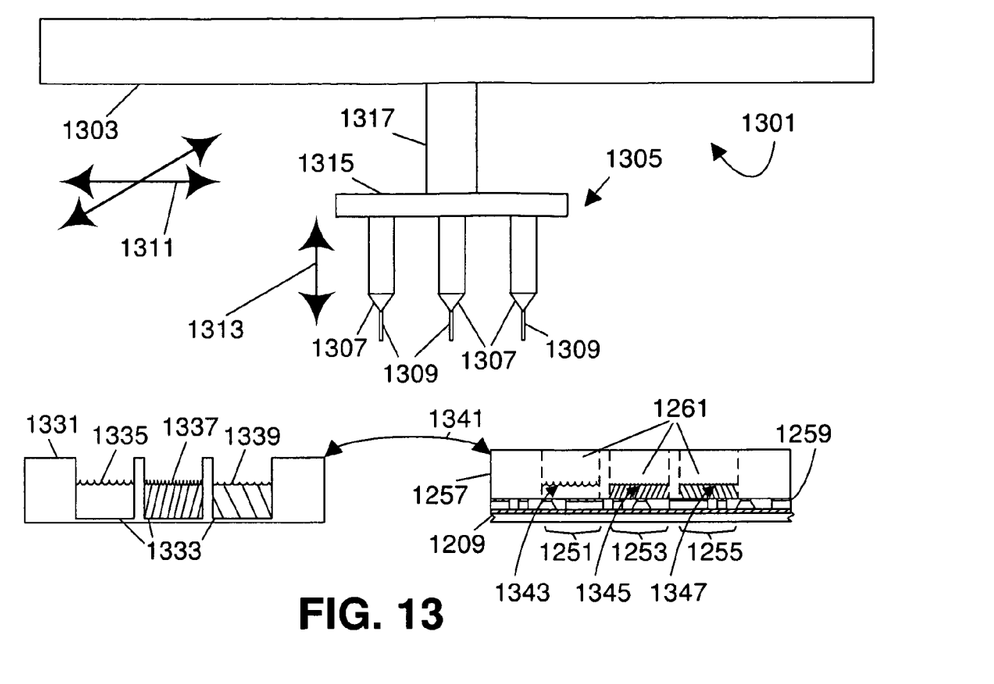
FIG. 13 illustrates use of an arm of a robotic mechanism to control an array 1305 of syringes 1309 to transfer liquid chemicals 1335, 1337 and 1339 to respective wells 1261. The liquid chemicals may be the same or different from each other.

With the stamps applied, the substrate may then be subjected to one or more subsequent processes, for purposes of production manufacturing or for testing. FIG. 13 is used to explain the application of a particular subsequent process, using reaction wells, where each region is subjected to a subsequent wet process. More particularly, FIG. 13 illustrates application of a different liquid chemical into different reaction wells 1261, for purposes of a combinatorial testing procedure. Even for a combinatorial test, it is not strictly required that different chemicals be used, e.g., combinatorial results may be obtained using at least two combinations of stamped substances and chemical processes; that is to say, a common chemical process may be used for multiple regions where different substances have been transferred as part of the stamping process, and different chemicals may be applied to regions that have each received stamps of a like or different transfer substance.

FIG. 13 shows a robotic mechanism 1301 that may include a robotic arm 1303 for manipulating an array 1305 of syringes 1307. Each syringe may include a needle 1309 for purposes of withdrawing and injecting a liquid chemical, as appropriate. The robotic arm 1303 may be the same robotic arm as was used for articulation of the stamp array (depicted by FIG. 12), with means of exchanging the stamp array of FIG. 12 for the syringe array 1305 of FIG. 13, or it may be a second robotic arm within the same workstation or, yet still, may be a second workstation. The robotic arm 1303 of FIG. 13 is likewise capable of moving the syringe array 1305 in each of X and Y dimensions (represented by numeral 1311) as well as in a vertical dimension (referenced by motion arrow 1313). As was the case for the stamp array, the syringes 1307 project vertically downward and are affixed to a base plate 1315, itself connected by an attachment bar 1317 (such as a quick release mechanism) for connection to the robotic mechanism 1301.

To transfer the one or more liquid chemistries to the reaction wells 1261, the syringe array 1205 is moved to a chemical station 1331 which contains the solution phase chemistry(ies) that are to be added to the reaction wells. FIG. 13 shows three different chemical vials 1333, each having a chemical depicted with different shading 1335, 1337 and 1339, to indicate that the chemicals may be different from one another, if desired. Importantly, the positioning of the syringes is advantageously made to correspond to both the positioning of vials, as well as the reaction wells 1261, such that vertical motion of the array and intake and release of the chemicals may be used to accomplish the transfer. The attachment bar 1317 may include a pneumatic feed, or an electronic control for creating negative and positive pressure for each syringe, to provide for appropriate intake and release of liquid chemicals for each syringe. Ideally, the control is configured such that each syringe 1307 may be separately controlled as to amount of chemical intake and release.

The syringe array 1305 may then be robotically moved (as indicated by motion arrow, 1341) to the substrate and reaction well assembly; to aid in understanding, these components will be identified in FIG. 13 using the same numbering as was used for FIG. 12. In particular, the substrate 1209 is seen in FIG. 13 as having a top surface layer 1259 with the reactor plate 1257 isolating three different regions 1251, 1253 and 1255 of the substrate for purposes of processing. FIG. 13 differs from FIG. 12, however, in that FIG. 13 shows that liquid chemistries have now been added to each reaction well 1261, each liquid (1343, 1345 and 1347) bearing a like shading as was used in connection with the second chemical station 1321. As appropriate for the particular processing or testing being conducted, the liquid chemicals are left in the reaction wells for an amount of time suitable to the particular process, with the syringe array 1305 being used to extract liquid chemistries once no longer needed. If desired, the substrate may then be subjected to further processing, such as using an additional liquid chemical process, or the substrate may be dried and evaluated, with the processes and associated substances then being characterized, and additional testing possibly performed, as was indicated above in connection with FIGS. 1 and 2.

As should be apparent from the foregoing description, the described methods, devices and systems may be used for carefully controlled processes, to effectively and rapidly perform a multitude of soft lithography and ensuing processes in a single clean room procedure, and in a manner that minimizes excess use of solvents. Applied to combinatorial testing, the described methods, devices and systems facilitate rapid processing of a large number of tests in parallel, thereby enhancing the design, optimization and qualification steps alluded to earlier.

C. Contemplated Approaches to Combinatorial Testing.

FIGS. 14-18 are used to describe a number of contemplated approaches to combinatorial testing that may be facilitated using the methods and devices described above.

Figure 14:
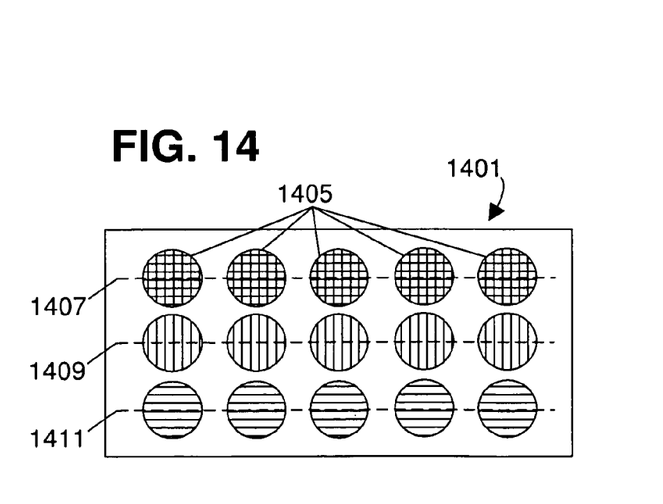

FIG. 14, for example, depicts a coupon 1401 where the substrate has been stamped with an array of fifteen soft lithography flat stamps (not shown in FIG. 14), where a total of three different substances have been deposited each in five regions 1405 in three rows 1407, 1409 and 1411 (corresponding to the substances). Each of the different substances is represented by a different hatch pattern in FIG. 14.

Figure 15:
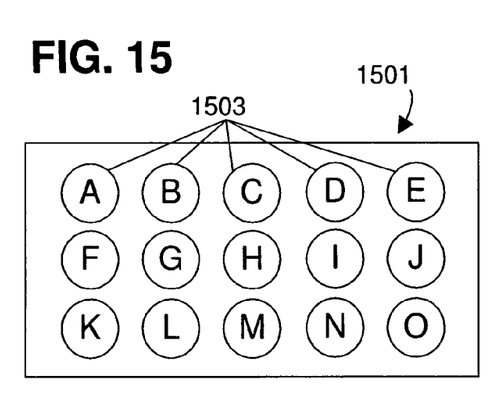
FIG. 15 is another plan view of a patterned substrate that has been stamped by an array of stamps with circular stamping surfaces. Unlike the substrate depicted in FIG. 14, however.

FIG. 15. depicts a coupon 1501 where the substrate has likewise been stamped with an array of fifteen flat stamps, but in FIG. 15, each of fifteen regions 1503 is identified with a corresponding letter "A" through "O" to indicate use of a different transfer substance. With reference to the dipping station referenced in FIG. 12, the array in this example could be dipped into fifteen corresponding substance supply reservoirs, and used to concurrently stamp the coupon 1501.

Figure 16:
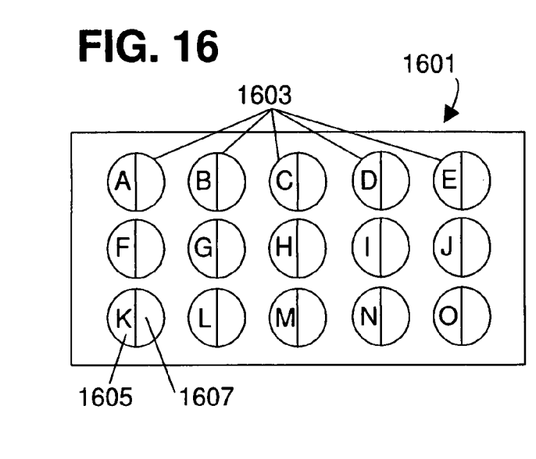
FIG. 16 is a plan view of a patterned substrate that has been stamped by an array where each stamp has a semicircular surface, each transferring a different substance "A"-"O" within a circular region formed by a reaction well (the well is not shown in FIG. 16). Each region is depicted to have (i) a semicircular "stamped" area, labeled with a letter "A" through "O" to indicate that it has been stamped with a particular substance, as well as (ii) a semicircular "unstamped" area that will be used as a control surface in subsequent processing for purposes of testing and evaluation.

FIG. 16 shows a coupon 1601 that has been also stamped using an array of fifteen stamps, but using stamps with a semicircular flat stamping surface. In this manner, each of plural regions 1603 may be made to have a stamped area 1605 and also to leave a room within each well for a control area 1607. Each stamped region is illustrated in FIG. 16 as having a different letter designation "A" through "O," again referencing an example where each region has been stamped with a different transfer substance, such that fifteen different stamping substances are present on the substrate.

Figure 17:
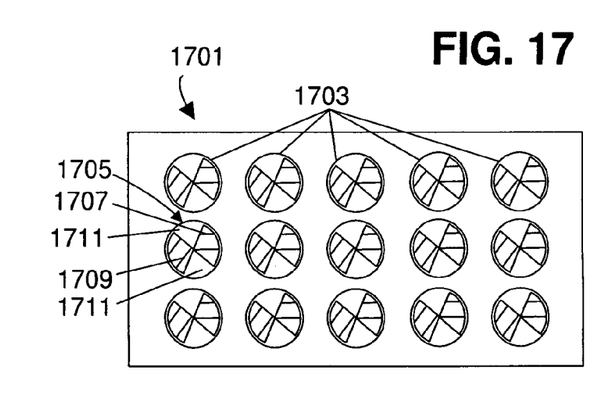
FIG. 17 is a plan view of a patterned substrate where thirty stamps have been applied within fifteen reaction wells (the reaction wells are not shown in FIG. 17). The fifteen circular regions corresponding to the reaction wells each show that one or two pie-shaped stamps have been used to deposit two different substances on the top layer of the substrate within each region, the deposition of each substance being depicted through different hatching. Within each region the stamping process could include simultaneous stamping by two stamps within each region, or the use of successive stamping processes to deposit the two materials. As also depicted by FIG. 17, the use of pie-shaped stamping surfaces allows room within each circular well and associated region for (i) deposit of two different stamping substances, as depicted by numerals 1707 and 1709 in FIG. 17, and (ii) the maintenance of one or more control areas 1711.

FIG. 17 illustrates a coupon 1701 which has been stamped with a pie-shaped stamping surface within regions 1703 to transfer two substances to each region. For ease of reference, a single such region 1705 has been numbered in detail in FIG. 17, and is seen to have a first pie-shaped stamped area 1707 (illustrated using horizontal cross-hatching), a second pie-shaped stamped area 1709 (illustrated using diagonal cross-hatching), and opposing control areas 1713 1711. The stamping process used for FIG. 17 could involve concurrent use of two stamps within each region, or if desired, successive use of a single stamp array in multiple iterations.

Figure 18:
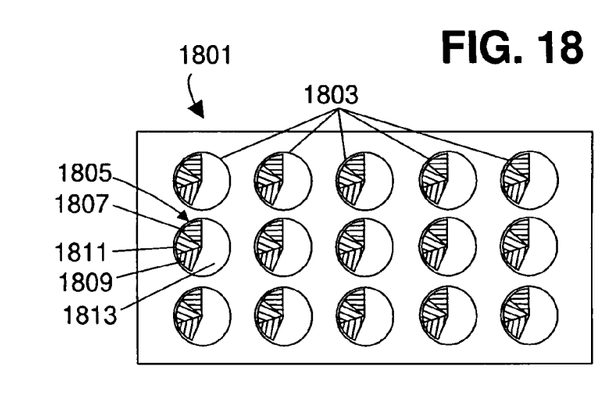

FIG. 18 illustrates a coupon 1801, showing regions 1803, similar to that depicted in FIG. 17 except that, in FIG. 18, two stamps are indicated to overlap one another; again for ease of reference, a single, particular region 1805 is numbered. The region 1805 includes a first area 1807 having only one transferred substance, a second area 1809 having a second transferred substance, a third area 1811 having both transferred substances together, and a control area 1813.

The foregoing examples are not exhaustive and many other combinations will readily occur to those having skill in semiconductor fabrication or materials science. While the use of regions having a specific, circular shape has been illustrated in FIGS. 14-18, it should be apparent that many other sizes and configurations of regions, stamps, stamping processes and control areas may be employed, using the methods, devices and systems described earlier.

IV. USE OF AN ALIGNMENT MECHANISM TO ASSIST STAMP FORMATION

Figure 19:
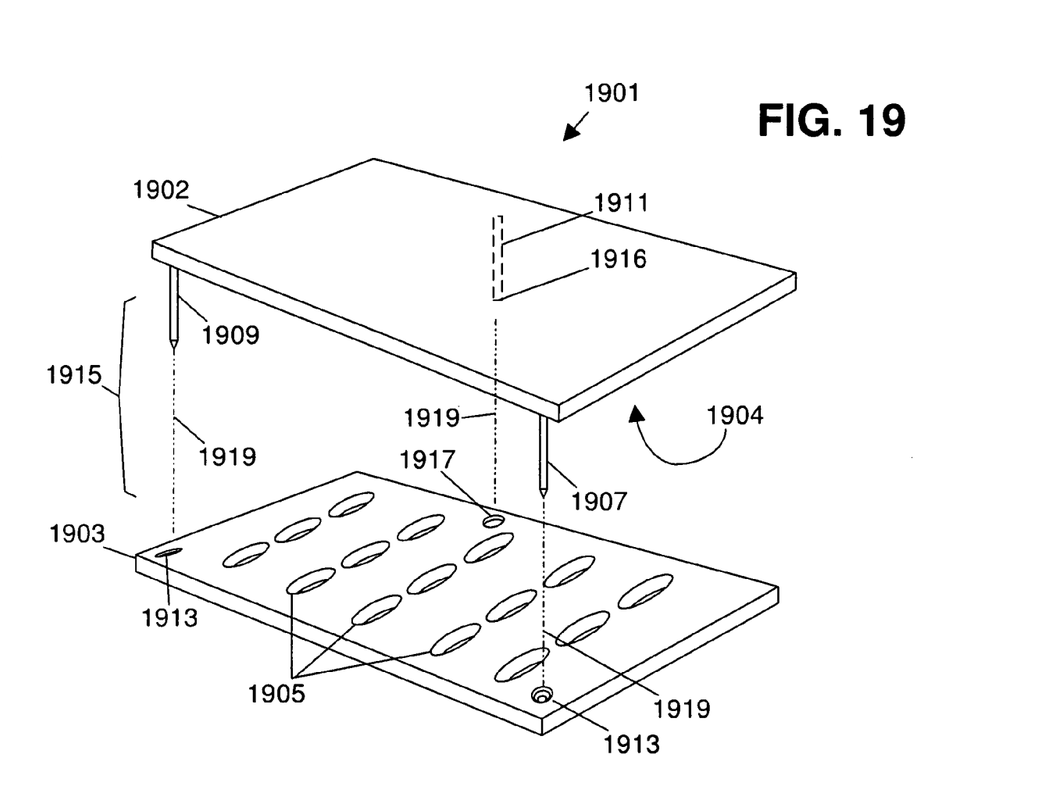
FIG. 19 is a perspective view showing the aligning of an array of stamps 1902 with a mold 1903 in a manner that will permit formation of individual stamps in the array in a manner centered about associated anchoring screws (discussed below). Neither a substrate (that will ultimately be stamped) nor the stamps are shown in FIG. 19 for convenience of illustration. The alignment mechanism depicted by FIG. 19 is a "pin, flat & slot" mechanism that uses three alignment legs 1907, 1909 and 1911.

FIG. 19 is used to help illustrate one possible alignment mechanism to ensure proper formation of each stamp in an array, for alignment and insertion into a corresponding reaction well. FIG. 19 presents a relatively simple mechanism that may be used to ensure that each anchoring screw of a stamp array is appropriately positioned within a mold, to ensure appropriate, balanced positioning of the screw within each stamp. A variety of alignment mechanisms may be selected by one having skill in the art, including optical, mechanical, electrical, and digital alignment mechanisms. FIG. 19 illustrates a simple mechanical mechanism that may be used to ensure proper alignment of each stamp in the center of each corresponding mold.

FIG. 19 shows a combination 1901 including both a stamp array 1902 and a mold plate 1903 that are to be aligned with respect to one another. The array 1902 is depicted as a base plate only, although it should be understood that the mounting mechanisms for the stamps (e.g., an anchoring screw) would ordinarily be mounted below the base plate (i.e., on the side of the base plate indicated by reference numeral 1904) and arranged to project downwardly into corresponding molds 1905. The example of FIG. 19 makes use of a "pin, flat and slot" mechanism, with three metal legs 1907, 1909 and 1911 being used to ensure proper alignment between the array and the mold plate and proper height positioning of the anchor screw within each stamp.

A first leg 1907 terminates in a pin that is adapted to engage 1919 a corresponding divot 1913 in the mold plate. The divot is tapered downward to a point, such that pin structure will in practice sit within a single spot only within the divot. A second leg 1909 similarly terminates in a pin structure, but is adapted to engage 1919 a slot 1913 in the mold plate. Each pin 1907, 1909 and 1911, has a height indicated by reference numeral 1915, selected to position the head of each anchoring screw at the appropriate height within each corresponding mold 1905. The first leg and associated divot have only one point of proper engagement, to form an effective pivot point; the second pin and its associated slot serve to guide the angular disposition between the base plate and the mold plate relative to the pivot point formed by the first leg, and the third leg serves to ensure that the second leg is positioned in an angularly proper manner; in this regard, the third leg has a non-acute bottom 1916, to engage 1919 a flat recess 1917 in a manner that ensures proper registration of the second leg with its corresponding slot.

While other alignment mechanisms may equivalently be used, the described mechanical mechanism provides an effective, low-cost, mechanical structure that facilitates proper alignment of each stamp upon its associated mounting mechanism, in a manner calculated to help ensure consistent application of force to a substrate, as has been described earlier. With the stamp array appropriately positioned, PDMS or another suitable polymer may be added to each mold and allowed to harden in place, that is, in an appropriately positioned manner on each corresponding anchoring screw.

V. CONCLUSION

Having thus described various implementations of the inventions, various alternatives and modifications are possible which will no doubt occur to those having skill in semiconductor fabrication. Such alternatives and modifications are within the scope and spirit of the present invention, as set forth by the claims enumerated below.

One contemplated implementation of the principles discussed above is a method that receives a substrate, stamps the substrate using an array of stamps, and exposes the substrate to a liquid chemical process. The stamps in the array can each be made to have stamping surfaces that substantially lie in a common plane, so that stamping action is concurrent, to create a corresponding array of stamped areas. In one example of this method, one can adhere different substances to different stamps, with concurrently stamping of all substances on an uppermost layer of the substrate; once the substrate is stamped, the stamped areas can be simultaneously exposed to one or more liquid chemical processes (i.e., the process can be the same for multiple stamping substances, or they can be made to differ). In still another example, as described earlier, a reaction well can be formed around the area of the substrate stamped with a first substance and a reaction well can also be formed around the area of the substrate stamped with another substance (there can be one reaction well enclosing both areas, or the wells can be dedicated to each stamped area). If multiple wells are used, different liquid chemicals can be inserted into each well and used for combinatorial processing. If desired, a flat stamp can be used to stamp substantially only the topmost layer of a patterned substrate, for example, for post and via processing, or other stamp geometries can be used.

Another contemplated implementation of the principles discussed above is as a product-by-a-process. In this implementation, a patterned semiconductor material may be exposed to combinatorial processing, including depositing a contact material on a top layer of the patterned semiconductor material in a first region, as well as a contact material in a second region; the materials can be the same or different across the regions. Processing may then be applied to perform a different process/contact material combination within each region. For example, the product can be a coupon or wafer produced by combinatorial processing where one process (e.g., a chemical process) has been applied to each of two different contact materials which were deposited in parallel; alternatively, a common contact material can be deposited for both regions and two different processes (e.g., two different chemicals) can be applied to achieve the combinatorial end. In a more detailed implementation, the combinatorial processing can be further enhanced by a reaction well formed around one or both regions, and the reaction well can be configured to contain both a stamped area and unstamped "control" area; as mentioned above, a liquid chemical can be applied within each reaction well, to simultaneously test both stamped and unstamped areas, via one procedure. If desired, a soft lithography stamping process can be used to deposit contact materials.

As will occur to those skill in the art, the methods and mechanisms described above may also be implemented as a method of doing business, for example, where one performs combinatorial testing as a service, for example, on a pre-supplied coupon. Otherwise stated, for a fee, one can receive a patterned or un-patterned semiconductor material, stamp the material with at least one substance using a substantially flat soft lithography stamp, to thereby coat a topmost layer, and then perform combinatorial testing of the material as a service-for-fee. This service may be employed using any of the methods or mechanisms described above, including for example stamping a patterned semiconductor material with plural substances. Alternatively, one can stamp the semiconductor material with one substance and test the effects of multiple processes upon different regions of the patterned semiconductor material, each one of the different regions characterized by a different substance-process combination. As mentioned above, a flat stamp process may be used to apply a substance only on the topmost layer of the semiconductor material, for example, for post and via processing.

Another implementation of the principles discussed above provides a soft lithography stamp array, having a mounting chassis and a number of stamps each having a substantially flat stamping surface. The surfaces can be arranged to normally lie in a substantially common plane, with a mounting mechanism for each stamp permitting resilient motion of the corresponding flat stamping surface away from the common plane (shared by the other stamps) with bias back toward the common plane. If desired, the stamps as mentioned can have a shock absorber consisting of a spring and piston (or rod) mechanism. In this manner, the flat surface of each stamp can be made to stamp a substrate such that all stamps in the array apply a substantially similar stamping pressure, and achieve uniform, resilient contact across the stamping surface of each stamp. If desired, each stamping surface can be made to be substantially similar (or identical) to every other stamp of the array in terms of size and shape, or the stamps (if desired) can be different. As mentioned earlier, in one embodiment, each substantially flat stamping surface can substantially semicircular in area, to facilitate stamped and unstamped regions within each reaction well (e.g., in an embodiment where circular reaction wells are used).

In other alternative implementations, any of the methods or mechanisms described above can include forming a reaction well around one or multiple stamped areas to isolate a region of interest. If desired, a reaction well can be formed before or after a stamping process, and can be made virtually any size relative to a stamped region; for example, if it is desired to provide a control area as discussed above, such that stamped and unstamped surfaces can be concurrently tested within each well area, the reaction well can be sized relative to the stamped area such that the stamped area occupies between one-quarter and three-quarters of the exposed area within each reaction well. In one embodiment, each stamped area can occupy approximately half of each reaction well, with the area being stamped after well formation, using semicircular stamps the stamp the substrate through the reaction well. Stamps can also be configured as pie-shapes such that, in a circular reaction well, the substrate can be rotated in multiple iterations to deposit multiple surface chemistries on a top layer within each reaction well, as has been alluded to earlier.

Still another embodiment of these principles provides a system, such as a robotic system, that can apply substances to stamps and transfer of substances to a substrate. The system can include a mounting device for receiving a substrate, an array of flat stamps, and an articulation mechanism. Each stamp in the array can have a substantially flat stamping surface, such that the stamping surfaces are collectively disposed in a common plane. The articulation mechanism can be used to articulate the array of stamps into a dipping station, where a substance may be concurrently adhered to each stamp, and to articulate the array to stamp the substrate and thus transfer each substance from the stamping surface to a top surface of the substrate via interfacial contact. If desired, substances can be used which form a Self Assembled Monolayer (SAM) on a top surface of the substrate. If appropriate to the process, the substance may also be selected to be one that renders an area of interfacial contact inert for subsequent chemical processing. In more detailed features of this embodiment, the system can further include a reactor plate having a width dimension and a length dimension, and a plurality of apertures, to form reaction wells as has been described above.

The systems and methods described above may also be employed in a variety of processes. For example, in one contemplated application, each stamping surface may be sized so as to be a subset of cross-sectional area represented by a corresponding reaction well, such that each stamping surface leaves an unstamped control area in its corresponding well. The system may be used to deposit resists, surfactants, bi-functional molecules, passivators, or chemicals adapted for some type of specific interaction with a substrate, as was mentioned earlier. Substances may be used to functionalize the top surface of the substrate without modifying any sidewalls, vias or trenches in a patterned substrate, or to inhibit a reaction on the top surface, or accelerate a reaction on the top surface. To provide some examples of specific types of processing that can be enhanced using these principles, the processing can include ECD copper plating, with the substance being selected to inhibit plating on the top surface. Alternatively, the process can be post-via etch cleaning and the substance can be selected to prevent damage to the top surface of any exposed "low k" material. Nearly any combination of stamping and processing may be used to improve selectivity between the top surface and at least one other layer below the top surface.

Various other alterations, modifications, and improvements will readily occur to those skilled in the art. Applications of the principles described herein to systems other than combinatorial testing systems and associated methods and products will readily occur to those skilled in the art. Also, as has been alluded-to above, a skilled designer may implement the methods and systems described above using any level of granularity, e.g., including large number of combinatorial tests that are conducted in parallel, e.g., using a dozen or more parallel stamps. It should also be observed that application of the systems, methods, arrays and other items described above may be made to subject matter other than semiconductor production, evaluation or testing. For example, the teachings provided above may be applied to the fabrication of other types of devices or products.

Accordingly, the foregoing discussion is intended to be illustrative only, to provide an example of one particular method and system for configuring a memory system; other designs, uses, alternatives, modifications and improvements will also occur to those having skill in the art which are nonetheless within the spirit and scope of the present disclosure, which is limited and defined only by the following claims and equivalents thereto.

The invention claimed is:

1. A method for performing combinatorial evaluation, comprising:
   using a flat stamp to deposit a first substance on a substrate within a first region, wherein the first substance forms a first pattern on the first region;
   using a flat stamp to deposit a second substance on the substrate within a second region, wherein the second substance forms a second pattern on the second region;
   forming a first reaction well that substantially encompasses and isolates the first region from at least part of the substrate;
   forming a second reaction well that substantially encompasses the second region;
   wherein the first region and the second region are isolated from one another;
   applying at least one subsequent process to each region, wherein the at least one subsequent process reacts with the first or second region using the first or second pattern as a mask; and
   evaluating results of application of the at least one process for each region.

2. A method according to claim 1, wherein evaluating results comprises:
   characterizing the first region and second region after applying the at least one subsequent process; and
   comparing first characterized results of the first region with second characterized results of the second region.

3. A method according to claim 2, wherein:
   evaluating results further comprises selecting none, one, or both of the first and second substance for further experimentation; and
   the subsequent process includes at least one liquid chemical process.

4. A method according to claim 1, wherein:
   using a flat stamp to deposit the first substance includes using a flat stamp to inhibit processing of a top most substrate layer within the first region, through application of the first substance;
   using a flat stamp to deposit the second substance includes using a flat stamp to inhibit processing of a top most substrate layer within the second region, through application of the second substance; and
   the subsequent process includes at least one of post processing or via processing.

5. A method according to claim 1, wherein the method further comprises using plural stamps mounted in parallel to concurrently stamp the substrate, such that the first and second substances are deposited in parallel.

6. A method according to claim 1, wherein:
   applying includes, after depositing the first and second substances, applying a liquid solution to the substrate within the reaction well encompassing the first region and applying a liquid solution to the substrate within the reaction well encompassing the second region.

7. A method according to claim 6, wherein:
   forming a reaction well that substantially encompasses the first region includes forming a first reaction well that substantially encompasses the first region and a control area not covered by either the first substance or the second substance; and
   forming a reaction well that substantially encompasses the second region includes forming a second reaction well, different from the first reaction well, that substantially encompasses the second region and a control area not covered by either the first substance or the second substance.

8. A method according to claim 1, wherein:
   the substrate is patterned in each of the first region and the second region; and at least one flat stamp is an unpatterned, blanket stamp.

9. A method according to claim 1, wherein using a flat stamp to deposit a first substance and using a flat stamp to deposit a second substance includes:
   mechanically mounting a first flat stamp and a second flat stamp in parallel, fixed relation to one another;
   mechanically articulating the first flat stamp and the second flat stamp to concurrently wet each stamp with a liquid substance; and
   mechanically articulating the first flat stamp and the second flat stamp in parallel to concurrently transfer a substance from each stamp onto corresponding regions of the substrate.

10. A method according to claim 9 wherein mechanically articulating the first flat stamp and the second flat stamp to concurrently wet them includes concurrently wetting them with two different liquid substances.

11. A method for performing combinatorial screening, comprising:
    using plural stamps to concurrently stamp a substrate, each stamp mounted so as to stamp a different region of the substrate relative to others of the plural stamps, wherein the stamping forms patterned layers on the different regions;
    forming a first reaction well that substantially encompasses and isolates the first region from at least part of the substrate;
    forming a second reaction well that substantially encompasses the second region;
    wherein the different regions are isolated from one another;
    selectively subjecting each stamped region of substrate to a subsequent wet process, wherein the at least one subsequent process reacts with the regions using the patterns as a mask; and
    evaluating results of the process.

12. A method according to claim 11, wherein selective subjecting includes isolating at least one stamped region for applying in isolation a wet process to the isolated at least one region.

13. A method according to claim 11, wherein selective subjecting includes:
    isolating two groups, each having at least one stamped region, relative to each other; and subjecting each group to a different subsequent wet process.

14. A method according to claim 11, wherein subjecting each stamped portion to a process includes depositing a liquid chemical agent in each of plural reaction wells.

15. A method according to claim 11, wherein evaluating results comprises:
   characterizing each region after application of the subsequent wet process; and
   comparing the characteristics of different regions.

* * * * *